H. NEUMAN.
WIND SHIELD CONSTRUCTION.
APPLICATION FILED DEC. 7, 1916. RENEWED MAR. 15, 1919.
1,302,953.
Patented May 6, 1919.
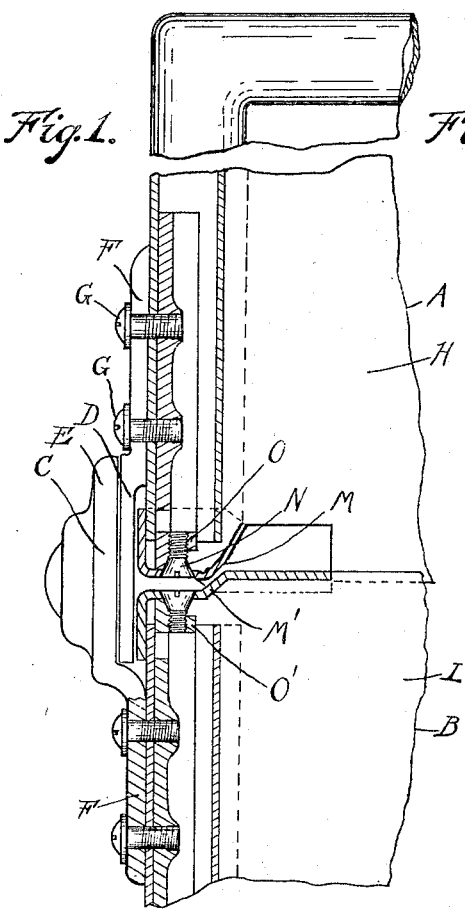
Fig.1.
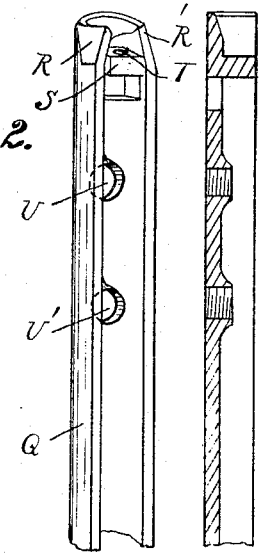
Fig.2. Fig.3.
Fig.4.
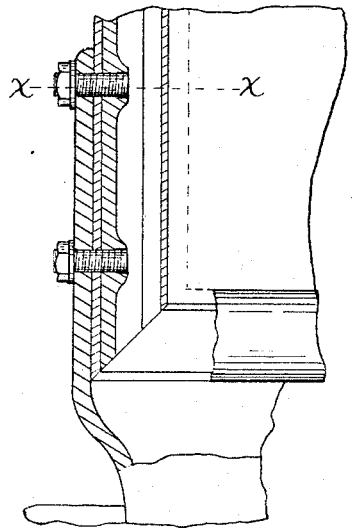
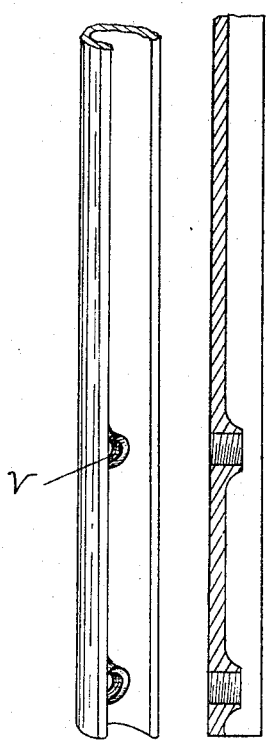
Inventor
Hugo Neuman
By Whittemore Hulbert & Whittemore
Attorneys

UNITED STATES PATENT OFFICE.

HUGO NEUMAN, OF DETROIT, MICHIGAN, ASSIGNOR TO MOTOR PRODUCTS CORPORATION, OF DETROIT, MICHIGAN, A CORPORATION OF NEW YORK.

WIND-SHIELD CONSTRUCTION.

1,302,953.     Specification of Letters Patent.     Patented May 6, 1919.

Application filed December 7, 1916, Serial No. 135,565. Renewed March 15, 1919. Serial No. 282,998.

*To all whom it may concern:*

Be it known that I, HUGO NEUMAN, a citizen of the United States of America, residing at Detroit, in the county of Wayne and State of Michigan, have invented certain new and useful Improvements in Wind-Shield Constructions, of which the following is a specification, reference being had therein to the accompanying drawings.

This invention relates to windshield constructions and refers more particularly to a new and improved arrangement for reinforcing windshields.

Among the objects of the invention is to provide a construction whereby windshields of certain types can be supplied with a reinforcing member which will give greater rigidity to the windshield frame and prevent any rattling of the parts; to provide a new and improved construction of reinforcement which can be stamped or struck from a single piece of metal; to provide a construction which can be easily put in place and concealed from view when the end clip is in position; and in general to provide a new and improved windshield construction of the character above referred to.

In the drawings:

Figure 1 is a side elevational view partly in section of a windshield embodying my invention;

Fig. 2 is a perspective view of the reinforcing member detached;

Fig. 3 is a longitudinal sectional view through the reinforcing member;

Fig. 4 is a cross section on the line *x—x* of Fig. 1.

Describing in detail the construction shown in the drawings, A and B designate the windshield sections which are pivotally secured together by a pivot member C. The latter is formed with the usual interlocking disk members D and E, each of which has a bearing portion F secured to the frame of the windshield by screws G. The glass panels H and I are held in grooves K formed in the tubing L of the frame while at their meeting edges the sections are provided with clips M and M'. The latter are fastened in position by screws or other suitable securing members N. In the present construction the screws are threaded into lugs O and O' formed in the reinforcing members Q.

The construction and arrangement of these reinforcing members forms an important feature of my invention, there being preferably a pair of these reinforcing members at each side of the windshield. As shown in detail in Figs. 2 and 3 the reinforcing members Q are channel shaped and at one end have their flanges R and R' bent inwardly. Adjacent the inturned ends of the flanges R and R' the metal is struck inward to provide a lug S which is tapped so as to provide a threaded aperture T for receiving the screws N which hold the glass clip M and N in position. The reinforcing member is also provided with a pair of apertures U and U' which are positioned to receive the screws G of the hinges. Additional screw threaded apertures V are provided near the other end of the reinforcing member, which member, in the assembled position of the parts, is inserted within the tubing L of the frame. The hinge screws are then extended into the position shown in Fig. 1 and a very rigid reinforcement obtained which is entirely concealed from view.

What I claim as my invention is:

1. In a windshield, the combination with a hollow frame member, of a reinforcing member fitted within said hollow member, said reinforcing member having a lug struck therefrom, and a glass clip secured to said lug.

2. In a windshield, the combination with a hollow frame member, of a pivot member secured thereto, a channel shaped reinforcing member positioned within the hollow frame member and having screw-threaded apertures into which the pivot securing members extend, a glass panel extending in the frame member, a clip for securing said glass panel in said frame member, and a securing device for said clip engaging a portion of said reinforcing member.

In testimony whereof I affix my signature.

HUGO NEUMAN.

Copies of this patent may be obtained for five cents each, by addressing the "Commissioner of Patents, Washington, D. C."